United States Patent [19]
Miyata

[11] 4,164,368
[45] Aug. 14, 1979

[54] ROUGHENED SHUTTER CURTAIN(S) FOR SINGLE LENS REFLEX CAMERA

[75] Inventor: Katsuhiko Miyata, Omiya, Japan

[73] Assignee: Asahi Kogaku Kogyo Kabushiki Kaisha, Tokyo, Japan

[21] Appl. No.: 814,951

[22] Filed: Jul. 12, 1977

[30] Foreign Application Priority Data

Jul. 14, 1976 [JP] Japan .............................. 52-93727[U]

[51] Int. Cl.² .......................... G03B 7/08; G03B 9/28
[52] U.S. Cl. ................................. 354/23 R; 354/56; 354/59; 354/152; 354/241
[58] Field of Search ................ 354/23 R, 49, 56, 59, 354/152, 154, 155, 241, 242, 245, 246, 248, 249, 51

[56] References Cited

U.S. PATENT DOCUMENTS

| 2,526,432 | 10/1950 | Svensson | 354/241 |
| 3,868,703 | 2/1975 | Ueda | 354/154 |
| 4,065,777 | 12/1977 | Maitani et al. | 354/23 R |

Primary Examiner—John Gonzales
Attorney, Agent, or Firm—Sughrue, Rothwell, Mion, Zinn and Macpeak

[57] ABSTRACT

The shutter curtain surface(s) in a single lens reflex camera on the side facing the lens is roughened, as by sand blasting, to provide more uniform light diffusion and reflective scattering characteristics, whereby the output of a light sensing element disposed in the mirror box facing the shutter provides a more accurate measure of the integrated or averaged light intensity distribution over the entire picture or viewing frame.

8 Claims, 6 Drawing Figures

FIG. 3 PRIOR ART    FIG. 4 PRIOR ART
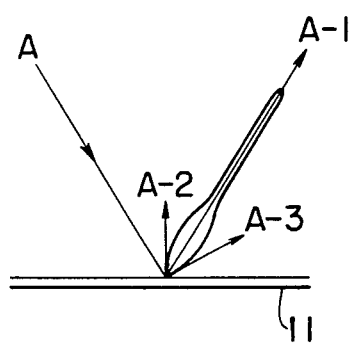
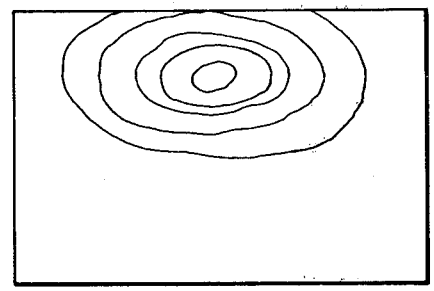
FIG. 5    FIG. 6
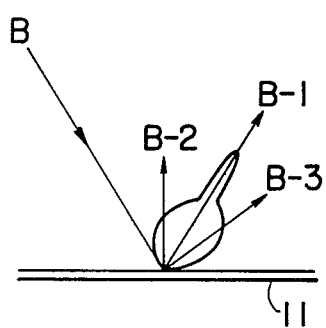
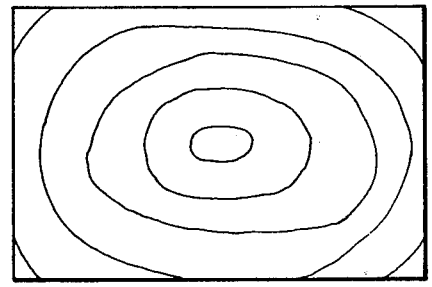

ROUGHENED SHUTTER CURTAIN(S) FOR SINGLE LENS REFLEX CAMERA

BACKGROUND OF THE INVENTION

This invention relates to a shutter curtain for a single lens reflex camera.

In recent years "systematization" has been a notable trend in the continuing development of single lens reflex cameras, as evidenced by exchangeable finders, lens attachments, increased functional adaptability, etc. As a result the construction of such cameras, including their light measuring optical systems and circuitry, has become more complicated, as with the advent of automatic exposure control which affords added handling ease to camera users. The location of the light sensing element(s) in a SLR camera, on the other hand, which is a prerequisite to any TTL light measuring system, varies widely between different cameras, with each location having certain advantages and disadvantages.

There are two basic light sensing element locations in common use; one in which the element is disposed at the periphery of the penta prism, and another in which the element is disposed in the lower portion of the mirror box, on the periphery of the focusing plate, or on the periphery of the reflex mirror.

The former type is advantageous in that the field of view in the finder is not impaired, and the light measuring and optical functions are comparatively standardized between cameras of different manufacturers. This type involves drawbacks, however, particularly with systematized, exchangeable finder cameras wherein electrical connections to the camera body must be made and different light sensing elements must be provided in each type of finder. In addition, when a given focusing plate is exchanged for another one some degree of exposure compensation must usually be made.

The type wherein the light sensing element is disposed in the lower portion of the mirror box functions independent of finder or focusing plate exchanges, however, and thus does not interfere with the systematization or automatization of the camera. It is accordingly an object of the present invention to provide an improved shutter curtain for a SLR camera of this type, wherein the measurement characteristics of light reflected by the plane of the shutter curtain are greatly improved.

Among the various light measuring characteristics of a fully open, T.T.L. single lens reflex camera, the most significant are:

(1) The ability of being interlockable with a lens diaphragm or aperture,
(2) The distribution of received light, and
(3) The light sensing efficiency.

In designing a camera light measuring system, heavy consideration must be given to these three characteristics.

Various shutter curtains are used in SLR cameras, with rubber lined cloth curtains and metallic (titanium) curtains being the most prevalent. Because such rubber lined cloth and metallic curtains fail to satisfy the aforesaid three characteristics of a light measuring system, however, particularly the distribution of received light and the light sensing effeciency, they must be modified or adapted in some way. The most prevalent method is to secure a reflecting substance or layer to the surface of the shutter curtain by adhesive coating or printing, but shutter curtains subjected to such processes are likely to undergo qualitative changes during prolonged usage, and hence lack long term reliability.

SUMMARY OF THE INVENTION

A shutter curtain according to the present invention, particularly a metallic shutter curtain, is characterized in that its surface facing the camera lens is roughened by sand blasting or the like so that incident light is more uniformly diffused and reflected onto the light sensing element, whereby the output of the latter provides a more accurate measure of the integrated or averaged light intensity distribution over the entire picture frame, rather than stressing or being distortingly representative of only a particular area thereof.

BRIEF DESCRIPTION OF THE DRAWINGS

In the drawings:

FIG. 3 shows the light reflecting characteristics of a prior art shutter curtain;

FIG. 4 shows the reflected light intensity distribution in a light sensing system incorporating a prior art shutter curtain;

FIG. 5 shows the light reflecting characteristics of a shutter curtain having a roughened surface according to the present invention; and, FIG. 6 shows the reflected light intensity distribution obtained using a shutter curtain with a roughened surface.

DETAILED DESCRIPTION OF THE PREFERRED EMBODIMENT

Figure 1:
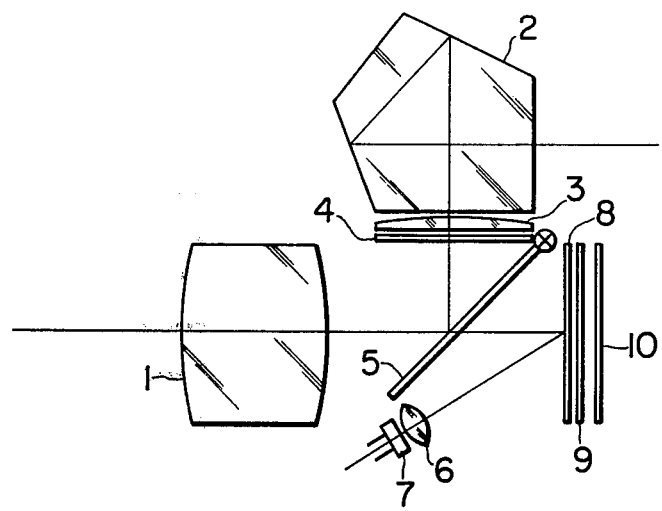
FIG. 1 shows a simplified cross-sectional view of the optical system of a single lens reflex camera, with the reflex mirror in a lowered position.

FIG. 1 is a simplified schematic cross sectional view of the optical system of a single lens reflex camera, wherein a light sensing element is disposed in the lower portion of the mirror box facing the film plane, and the reflex mirror is in its lowered position.

The light flux passing through an objective lens 1 is reflected upwardly at a right angle by the mirror 5 and ultimately reaches the photographers eye through a Fresnel lens 4, an image glass 3 and a penta prism 2. Reference numerals 8 and 9 designate the front and rear shutter curtains, respectively, 10 is the picture film, 6 is a focusing lens, and 7 is a light sensing element.

Figure 2:
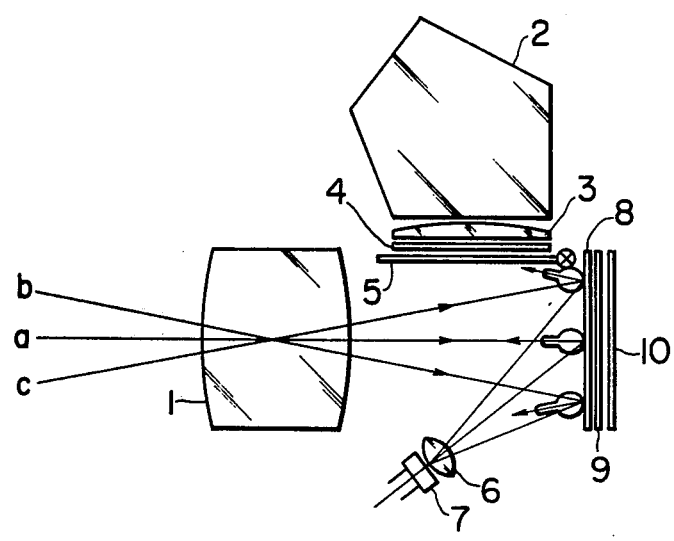
FIG. 2 shows a similar cross-sectional view with the reflex mirror in a raised position, and with incoming light fluxes being diffused and reflected by the roughened surface of a shutter curtain.

In the companion view of FIG. 2 the mirror 5 is in its upward or raised position, whereat an exposure is about to be made. If the surfaces of the front or rear curtains 8, 9 remain unroughened, the intensity of the reflected light incident upon the the light sensing element 7 from entering fluxes a and c is relatively low or weak. In contrast thereto, if the front or rear curtains have a roughened surface, considerably greater proportions or intensities of the light fluxes a and c are reflected onto the light sensing element, as schematically shown by the vector arrows in FIG. 2. On the other hand, if both the front and rear shutter curtains have a smooth surface, then only the light flux b is primarily emphasized or intensified with respect to the light sensing element, whereby the light measurement distribution is shifted toward the top of the picture frame. This distorted reflected intensity of the light flux b is lowered, however, by providing a roughened surface on the front or rear shutter curtains, as will be more apparent from FIGS. 3 and 5.

FIG. 3 shows a prior art shutter curtain 1 having a relatively smooth surface upon which a ray or flux of light A is incident. Because of the smooth surface, the main reflection flux A-1 has an extremely high intensity, while the intensity of the secondary or side fluxes A-2 and A-3 is considerably lower. This results in a reflected light distribution pattern as shown in FIG. 4, wherein the light measurement intensity is concentrated in the lower portion of the film plane corresponding to the upper portion of the photographic object.

FIG. 5 shows a shutter curtain 11' having a roughened surface. Assuming that a flux of light B is incident upon the curtain, the difference in intensity between the reflected light fluxes B-1, B-2 and B-3 is greatly reduced as compared with FIG. 3, which results in a more desirable or even reflected light distribution intensity pattern, as shown in FIG. 6. That is, assuming that A=B, then A-1>B-1; A-2<B-2; and A-3<B-3. Thus, incident image light is more widely and uniformly reflected by the roughened shutter curtain(s) according to the present invention, which results in a more truly representative or more evenly integrated output from the light sensing element and improved film exposure.

Such a roughened shutter curtain having enhanced light dispersing or diffusing characteristics has the advantages of improved reliability, improved light measuring characteristics, being less costly to manufacture, and being usable with a vertically travelling shutter curtin. The shutter curtain surface(s) facing the lens 1 may be roughened by sand blasting or the like, preferably to the extent that they exhibit a degree of roughness approximately corresponding to that of a 600 mesh screen (Japanese Industrial Standard), which yields greatly improved photographic results as compared with prior art shutter curtains having printed or coated surface patterns.

What is claimed is:

1. In a single reflex camera operable in a through-the-lens light measuring mode and including a reflex mirror box, a lens mounted on a front side of the box, at least one shutter curtain mounted in the box proximate the opposite, rear side thereof, and a light sensing element mounted in the box and oriented to sense light flux entering through the lens and reflected thereon by the surface of the shutter curtain facing the lens, the improvement characterized by:
   said shutter curtain being metallic and its surface being bare, uncoated and directly roughened over its entirety to provide more uniform light diffusion and reflective scattering characteristics, whereby the output of the light sensing element provides a more accurate measure of the integrated or averaged light intensity distribution over the entire picture or viewing frame.

2. A camera as defined in claim 1, wherein the shutter curtain is metallic and its surface is roughened by sand blasting.

3. A camera as defined in claim 1, wherein the degree of roughness corresponds to that of a 600 mesh screen according to Japanese Industrial Standards.

4. A camera as defined in claim 2, wherein the degree of roughness corresponds to that of a 600 mesh screen according to Japanese Industrial Standards.

5. A camera as defined in claim 1, wherein there are separate front and rear shutter curtains, and the surfaces of both such curtains facing the lens are roughened.

6. A camera as defined in claim 2, wherein there are separate front and rear shutter curtains, and the surfaces of both such curtains facing the lens are roughened.

7. A camera as defined in claim 3, wherein there are separate front and rear shutter curtains, and the surfaces of both such curtains facing the lens are roughened.

8. A camera as defined in claim 4, wherein there are separate front and rear shutter curtains, and the surfaces of both such curtains facing the lens are roughened.

* * * * *